US010523668B2

(12) United States Patent
Hong et al.

(10) Patent No.: US 10,523,668 B2
(45) Date of Patent: Dec. 31, 2019

(54) AUTHENTICATION METHOD WITH ENHANCED SECURITY BASED ON EYE RECOGNITION AND AUTHENTICATION SYSTEM THEREOF

(71) Applicant: NHN PAYCO CORPORATION, Seongnam-si (KR)

(72) Inventors: Sunggon Hong, Seongnam-si (KR); Dongheon Yu, Seongnam-si (KR)

(73) Assignee: NHN PAYCO Corporation, Seongnam-si (KR)

( * ) Notice: Subject to any disclaimer, the term of this patent is extended or adjusted under 35 U.S.C. 154(b) by 0 days.

(21) Appl. No.: 15/474,508

(22) Filed: Mar. 30, 2017

(65) Prior Publication Data
US 2017/0289146 A1    Oct. 5, 2017

(30) Foreign Application Priority Data
Apr. 4, 2016  (KR) .................. 10-2016-0041057

(51) Int. Cl.
*H04L 29/06* (2006.01)
*G06F 21/32* (2013.01)

(52) U.S. Cl.
CPC .......... *H04L 63/0861* (2013.01); *G06F 21/32* (2013.01)

(58) Field of Classification Search
CPC ................................................ H04L 63/0861
See application file for complete search history.

(56) References Cited

U.S. PATENT DOCUMENTS

| | | | | |
|---|---|---|---|---|
| 9,152,837 | B2* | 10/2015 | Matos | G06K 9/00 |
| 9,953,231 | B1* | 4/2018 | Medina, III | G06K 9/00892 |
| 10,108,792 | B2* | 10/2018 | Hou | H04L 9/3231 |
| 2002/0150281 | A1 | 10/2002 | Cho | |
| 2006/0120707 | A1* | 6/2006 | Kusakari | A61B 5/1171 |
| | | | | 396/18 |
| 2009/0110248 | A1* | 4/2009 | Masuda | G06F 21/32 |
| | | | | 382/118 |
| 2009/0169064 | A1 | 7/2009 | Kim et al. | |
| 2010/0272326 | A1* | 10/2010 | Abe | G06F 21/32 |
| | | | | 382/115 |

(Continued)

FOREIGN PATENT DOCUMENTS

| | | |
|---|---|---|
| JP | 2008-197713 | 8/2008 |
| KR | 10-2002-0071329 | 9/2002 |

(Continued)

OTHER PUBLICATIONS

Office Action dated May 15, 2018, in Japanese Patent Application No. 2017-065317.

*Primary Examiner* — Simon P Kanaan
(74) *Attorney, Agent, or Firm* — H.C. Park & Associates, PLC (57) ABSTRACT

An authentication method and system with an enhanced security based on eye recognition includes registering eye information extracted from an input image through a pre-registration process; receiving an eye recognition request; verifying whether a web login request associated with login information that is mapped to the eye information is present in response to receiving an eye recognition request; and performing an eye recognition in response to the web login request associated with the login information being verified to be present.

14 Claims, 10 Drawing Sheets

(56) References Cited

U.S. PATENT DOCUMENTS

| | | | | |
|---|---|---|---|---|
| 2015/0128240 A1* | 5/2015 | Richards | ............ | H04L 63/0861 |
| | | | | 726/7 |
| 2017/0124309 A1* | 5/2017 | Tang | ........................ | G06F 21/32 |
| 2017/0243063 A1* | 8/2017 | Kaneko | ................... | G06F 21/31 |

FOREIGN PATENT DOCUMENTS

| KR | 10-2005-0065195 | 5/2006 |
|---|---|---|
| KR | 10-2006-0056805 | 5/2006 |
| KR | 10-1476173 | 12/2014 |
| WO | 2015/168641 | 11/2015 |

* cited by examiner

AUTHENTICATION METHOD WITH ENHANCED SECURITY BASED ON EYE RECOGNITION AND AUTHENTICATION SYSTEM THEREOF

CROSS-REFERENCE TO RELATED APPLICATION

This application claims priority from and the benefit of Korean Patent Application No. 10-2016-0041057, filed on Apr. 4, 2016, which is hereby incorporated by reference for all purposes as if fully set forth herein.

BACKGROUND

Field

Exemplary embodiments relate to technology for processing a user authentication based on eye recognition.

Discussion of the Background

Currently, with the development of technology, a user authentication method of is authenticating a user based on a variety of biometric information of the user has been increasingly used for a more accurate authentication among various types of user authentication techniques.

Such biometric information recognition technology may refer to technology for acquiring and analyzing information about specific body portions of a user, comparing the analyzed information to existing stored data, and identifying and authenticating the user. Such biometric information recognition technology cannot be used or reproduced by another user, unlike an identifier (ID) card or a password, and the biometric information of a user cannot change or be lost. Thus, the biometric information recognition technology may be applied to various fields, such as a financial service, communication, information security, medical care, security management, e-commerce, and the like.

Biometric information of the user used in the biometric information recognition technology uses, for example, a fingerprint, an iris, a seat gland structure, blood vessels, veins, voice, and the like. As an example of the biometric information recognition technology, Korean Patent Registration No. 10-1476173 registered on Dec. 18, 2014, discloses a user authentication method and system using an iris characteristic that may easily perform a user authentication using a unique iris characteristic of an eye of a user.

SUMMARY

Exemplary embodiments provide an authentication method and system that may provide a user authentication technique with an enhanced security using an eye recognition technique.

Exemplary embodiments also provide an authentication method and system that may perform authentication processing on a user, for example, requesting a web login, based on eye recognition in a mobile application.

Additional features of the inventive concept will be set forth in the description which follows, and in part will be apparent from the description, or may be learned by practice of the inventive concept.

Exemplary embodiments disclose an authentication method at an electronic device comprising a processor configured to execute computer-readable instructions, the authentication method comprising: registering an eye information extracted from an input image through a pre-registration process; receiving an eye recognition request; verifying whether a web login request, associated with a login information that is mapped to the eye information, is present in response to receiving the eye recognition request; and performing an eye recognition in response to the web login request associated with the login information being verified to be present.

Exemplary embodiments also disclose an authentication method at a server comprising a processor configured to execute computer-readable instructions, the authentication method comprising: receiving a login request based on an eye recognition and a login information for a webpage associated with the server; receiving, from an electronic device corresponding to the login information, an eye recognition result performed at the electronic device; and authenticating a login to the webpage corresponding to the login information based on the eye recognition result.

Exemplary embodiments also disclose an authentication system configured as a computer, the authentication system comprising: a processor configured to execute computer-readable instructions to: register an eye information extracted from an input image through a pre-registration process; receive an eye recognition request; verify whether a web login request associated with a login information that is mapped to the eye information is present in response to receiving an eye recognition request; and perform an eye recognition in response to the web login request associated with the login information being verified to be present.

Exemplary embodiments also disclose an authentication system configured as a computer, the authentication system comprising: a processor configured to execute computer-readable instructions to: receive a login request based on an eye recognition and a login information associated with a webpage associated with the server; and receive, from an electronic device corresponding to the login information, an eye recognition result performed at the electronic device; and authenticate a login to the webpage corresponding to the login information based on the eye recognition result.

It is to be understood that both the foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept and are incorporated in and constitute a part of this specification, illustrate exemplary embodiments of the inventive concept, and together with the description serve to explain the principles of the inventive concept.

DETAILED DESCRIPTION OF THE ILLUSTRATED EMBODIMENTS

One or more exemplary embodiments will be described in detail with reference to the accompanying drawings. Exemplary embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some exemplary embodiments. Unless otherwise noted, like reference characters denote like elements throughout the attached drawings and written description, and thus descriptions will not be repeated.

In the drawings, the size and relative sizes of regions and components may be exaggerated for clarity. Like numerals denote like elements.

When an element is referred to as being "on," "connected to," or "positioned on" another element or layer, it may be directly on, connected to, or positioned on the other element or intervening elements may be present. When, however, an element is referred to as being "directly on," "directly connected to," or "directly positioned on" another element, there are no intervening elements present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

The terminology used herein is for the purpose of describing exemplary embodiments only and is not intended to be limiting. As used herein, the singular forms "a", "an", and "the" are intended to include the plural forms as well, unless the context clearly indicates otherwise. Moreover, the terms "comprises" and/or "comprising", "have," "having," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Exemplary embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more exemplary embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions (i.e., code) in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more exemplary embodiments, computer processing devices may be described as including various functional units that perform various operations and/or functions to increase the clarity of the description. However, computer processing devices are not intended to be limited to these functional units. For example, in one or more exemplary embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more exemplary embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the exemplary embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the exemplary embodiments, or they may be known devices that are altered and/or modified for the purposes of exemplary embodiments.

A hardware device, such as a computer processing device, may run an operating system (OS) and one or more software applications that run on the OS. The computer processing device also may access, store, manipulate, process, and create data in response to execution of the software. For simplicity, one or more exemplary embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of exemplary embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalent.

Hereinafter, exemplary embodiments will be described with reference to the accompanying drawings.

Figure 1:
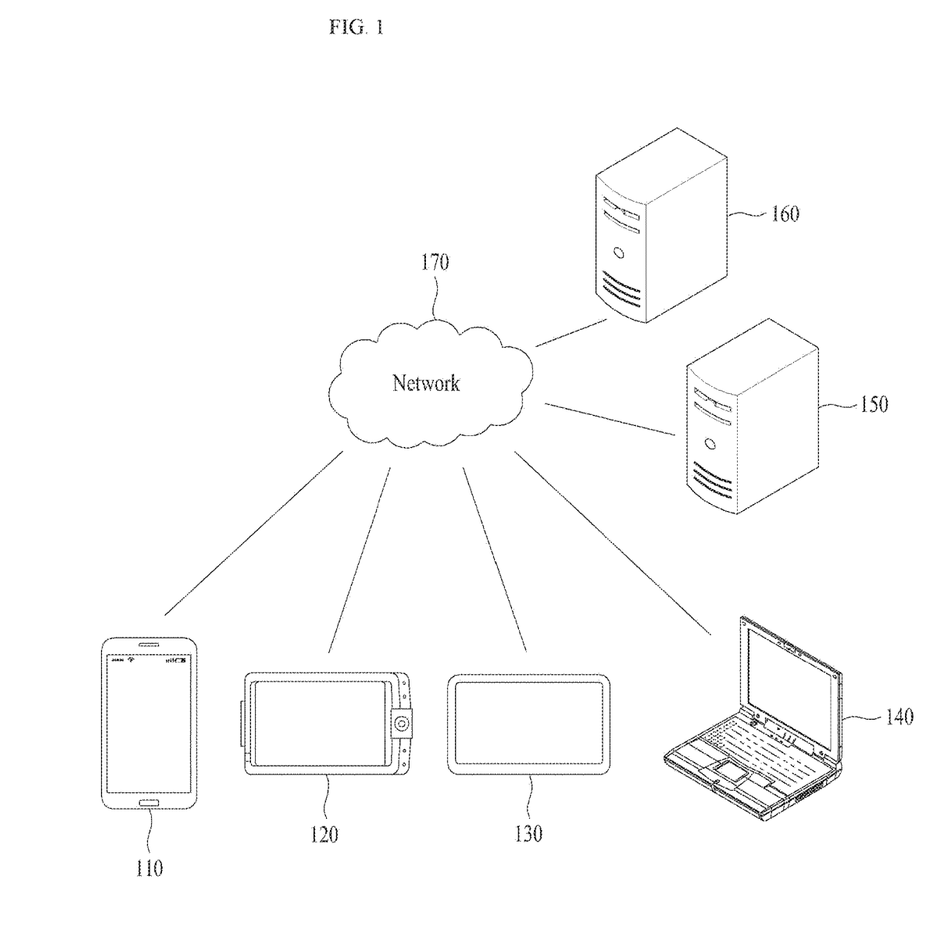
FIG. 1 illustrates an example of a network environment according to an exemplary embodiment.

FIG. 1 is a diagram illustrating an example of a network environment according to an exemplary embodiment. Referring to FIG. 1, the network environment may include a plurality of electronic devices 110, 120, 130, and 140, a plurality of servers 150 and 160, and a network 170. FIG. 1 is provided as an example only and thus, the number of electronic devices and/or the number of servers are not limited thereto.

Each of the plurality of electronic devices 110, 120, 130, and 140 may be a fixed terminal or a mobile terminal configured as a computer device. For example, the plurality of electronic devices 110, 120, 130, and 140 may be a smartphone, a mobile phone, navigation, a computer, a laptop computer, a digital broadcasting terminal, a personal digital assistant (PDA), a portable multimedia player (PMP), a tablet personal computer (PC), and the like. For example, the electronic device 110 may communicate with other electronic devices, for example, the electronic devices 120, 130, and/or 140, and/or the servers 150 and/or 160 over the network 170 in a wired communication or in a wireless communication.

The communication scheme is not particularly limited and may include a communication method that uses, for example, a near field communication (NFC) between devices as well as a communication method using a communication network, for example, a mobile communication network, the wired Internet, the wireless Internet, and a broadcasting network, which may be included in the network 170. For example, the network 170 may include at least one of network topologies that include networks, for example, a personal area network (PAN), a local area network (LAN), a campus area network (CAN), a metropolitan area network (MAN), a wide area network (WAN), a broadband network (BBN), the Internet, and the like. Also, the network 170 may include at least one of network topologies that include a bus network, a star network, a ring network, a mesh network, a star-bus network, a tree or hierarchical network, and the like. However, it is only an example and the exemplary embodiments are not limited thereto.

Each of the servers 150 and 160 may be configured as a computer apparatus or a plurality of computer apparatuses that provides, for example, instructions, codes, files, contents, services, etc. through communication with the plurality of electronic devices 110, 120, 130, and/or 140 over the network 170.

For example, the server 160 may provide a file for installing an application to the electronic device 110 over the network 170. In this case, the electronic device 110 may install the application using the file provided from the server 160. Also, the electronic device 110 may connect to the server 150 and may receive a service or content provided from the server 150 under control of at least one program (for example, a browser or the installed application) and an operating system (OS) included in the electronic device 110. For example, in response to a service request message transmitted from the electronic device 110 to the server 150 over the network 170 under control of the application, the server 150 may transmit a code corresponding to the service request message to the electronic device 110 and the electronic device 110 may configure and display a screen corresponding to the code under control of the application, thereby providing the content to a user. For example, the server 150 may serve as a service platform that includes, for example, a payment service, and may perform authentication of a user requesting the service in conjunction with the application installed on the electronic device 110.

Figure 2:
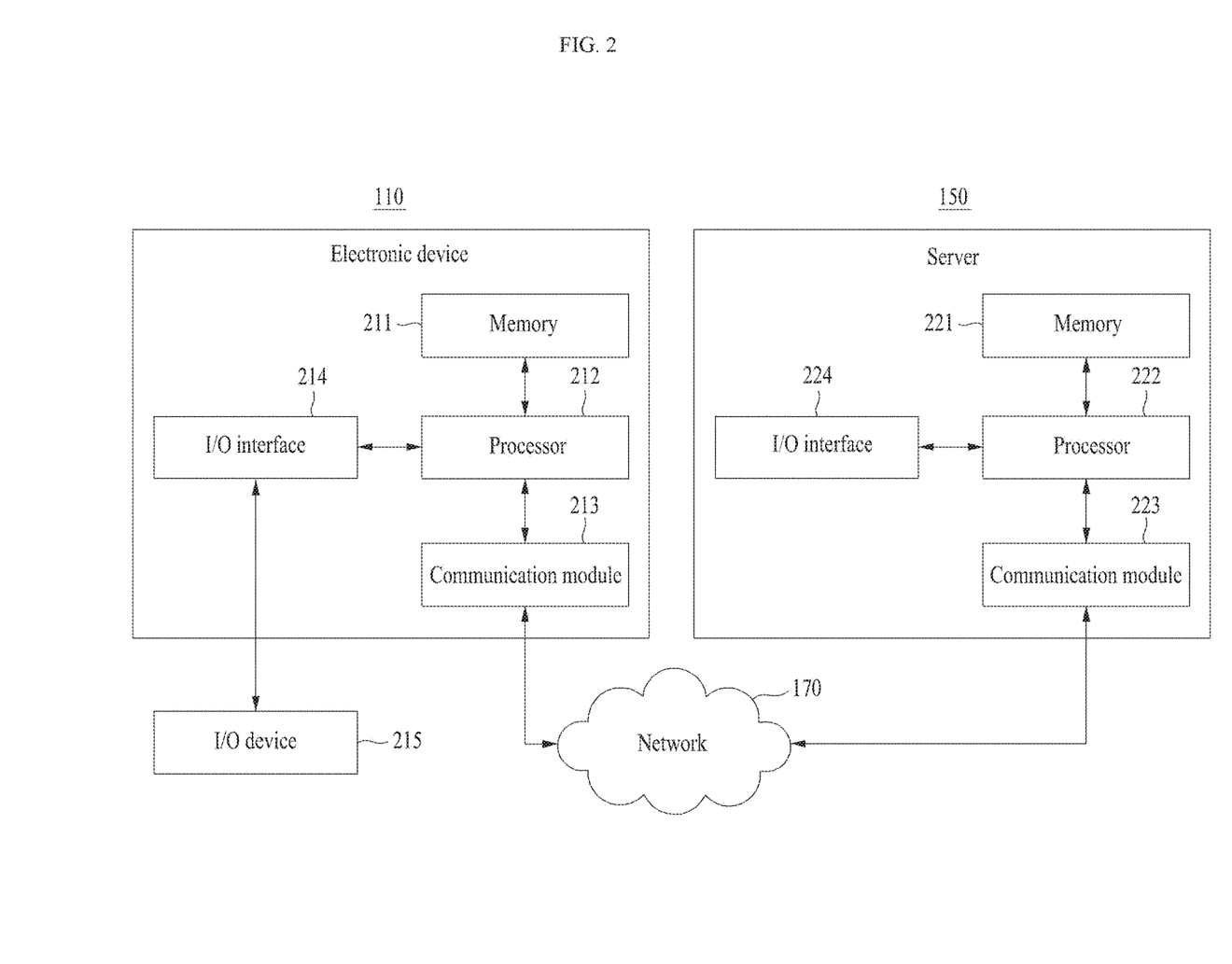
FIG. 2 illustrates an example of an electronic device and a server according to an exemplary embodiment.

FIG. 2 is a block diagram illustrating an example of a configuration of an electronic device and a server according to an exemplary embodiment. FIG. 2 illustrates a configuration of the electronic device 110 as an example for a single electronic device and illustrates a configuration of the server 150 as an example for a single server. The same or similar constituent elements may be applicable to other electronic devices, for example, the electronic devices 120, 130, and/or 140, or the server 160, and exemplary electronic devices or servers may have same or similar constituent elements, but the inventive concept is not limited thereto.

Referring to FIG. 2, the electronic device 110 may include a memory 211, a processor 212, a communication module 213, and an input/output (I/O) interface 214, and the server 150 may include a memory 221, a processor 222, a communication module 223, and an I/O interface 224. Also, an OS and at least one program code, for example, a code for an application, a browser, etc., that may be installed and executed on the electronic device 110, may be stored on the memory 211 and memory 221. Such software elements may be loaded from an exemplary computer-readable storage medium separate from the memory 211 and memory 221 using a drive mechanism. An exemplary computer-readable storage medium may include, for example, a floppy drive, a disk, a tape, a DVD/CD-ROM drive, a memory card, etc. According to exemplary embodiments, software elements may be loaded to the memory 211 and memory 221 through the communication module 213 and communication module 223 instead of, or in addition to, the computer-readable storage medium. For example, at least one program may be loaded to the memory 211 and memory 221 based on a program, for example, the application, installed by files provided over the network 170 from developers or a file distribution system, for example, the server 160, which provides an installation file for the application.

The processor 212 and processor 222 may be configured to process computer-readable instructions, for example, the aforementioned at least one program code, of a computer program by performing basic arithmetic operations, logic operations, and I/O operations. The computer-readable instructions may be provided from the memory 211 and memory 221 and/or the communication module 213 and communication module 223 to the processor 212 and processor 222. For example, the processor 212 and processor 222 may be configured to execute received instructions in response to the program code stored on the storage device, such as the memory 211 and memory 221.

The communication module 213 and communication module 223 may be configured to perform communication between the electronic device 110 and the server 150 over the network 170, and may be configured for communication with an exemplary electronic device, for example, the electronic device 120 or an exemplary server, for example, the server 160. For example, the processor 212 of the electronic device 110 may transfer a request created based on a program code stored on the storage device such as the memory 211, to the server 150 over the network 170 under control of the communication module 213. Moreover, a control signal, an instruction, content, a file, etc., provided under control of the processor 222 of the server 150 may be received at the electronic device 110 through the communication module 213 of the electronic device 110 by going through the communication module 223 and the network 170. For example, a control signal, an instruction, etc., of the server 150 received through the communication module 213 may be transferred to the processor 212 or the memory 211, and content, a file, etc., may be stored on a storage medium further includable in the electronic device 110.

The I/O interface 214 and I/O interface 224 may be used for interface with an I/O device 215. For example, an input device may include a keyboard, a mouse, etc., and an output device may include a device, such as a display for displaying a communication session of an application. As another example, the I/O interface 214 may be a device for interface with an apparatus in which input and output are integrated, such as a touch screen. For example, when processing instructions of the computer program loaded to the memory 211, the processor 212 of the electronic device 110 may display a service screen configured using data provided from the server 150 or the electronic device 120, or may display content on a display through the I/O interface 214.

According to exemplary embodiments, the electronic device 110 and the server 150 may include a greater or lesser number of elements than the number of elements shown in FIG. 2. For example, the electronic device 110 may include at least a portion of the I/O device 215, or may further include, for example, a transceiver, a global positioning system (GPS) module, a camera, a variety of sensors, a database, etc. For example, if the electronic device 110 is a smartphone, the electronic device 110 may be configured to further include a variety of elements, for example, an accelerometer sensor, a gyro sensor, a camera, various physical buttons, a button using a touch panel, an I/O port, a vibrator for vibration, etc., which are generally included in a smartphone.

Figure 3:
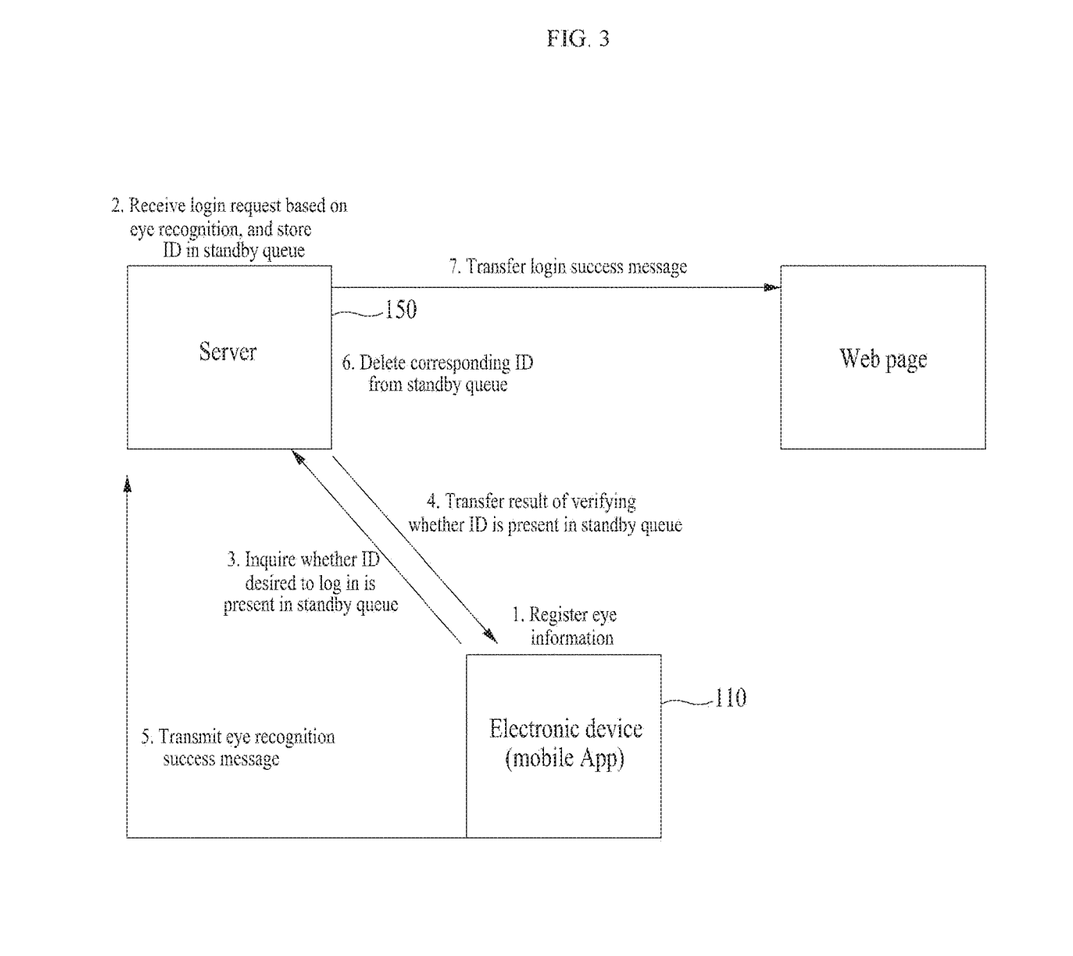
FIG. 3 illustrates an example of a user authentication scenario based on eye recognition according to an exemplary embodiment.

FIG. 3 illustrates an example of a user authentication scenario based on eye recognition according to an exemplary embodiment.

Figure 4:
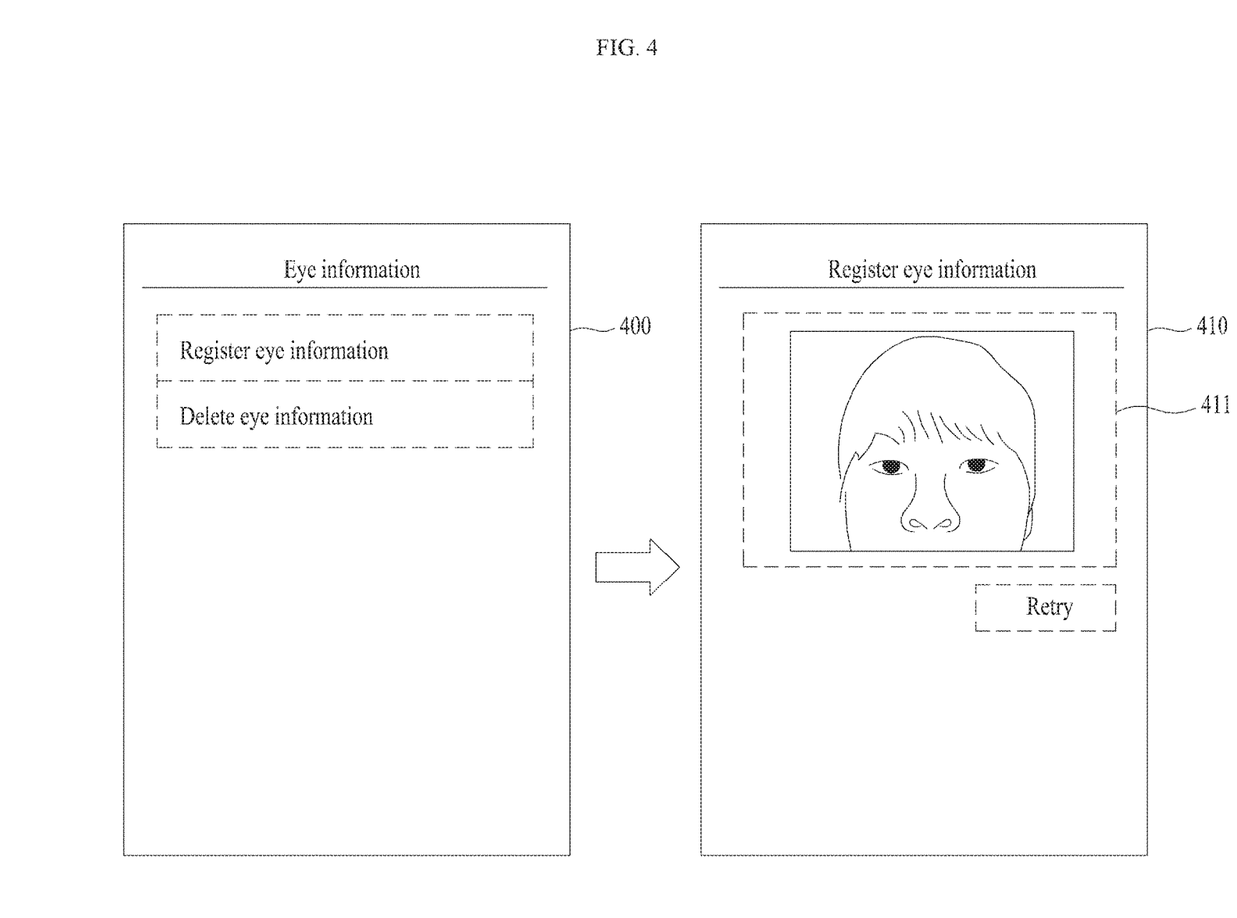
FIG. 4 illustrates an example of eye information registration process according to an exemplary embodiment.

In 1, a user may execute an application installed on the electronic device 110 and then register eye information through a pre-registration process. For example, referring to FIG. 4, in response to a user selecting an "eye information registration" menu on a menu screen 400 of the application, an eye information registration screen 410 for registering eye information may be provided. Here, the eye information registration screen 410 may include a camera execution screen 411 capable of capturing eyes of the user. The application may receive an image captured through a camera and may extract and register eye information of the user from the image. The eye information extracted and registered in the application may be stored in a local terminal, such as, the electronic device 110.

Figure 5:
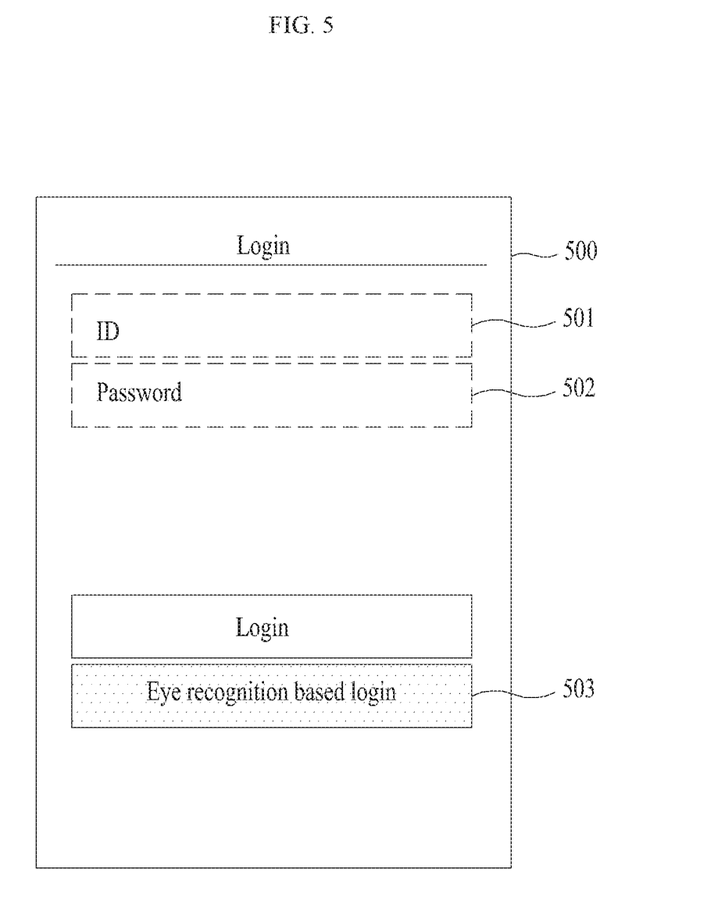
FIG. 5 illustrates an example of a web login process according to an exemplary embodiment.

In 2, the user may input an ID on a webpage to use a service and may request a login based on the eye recognition. The server 150 may receive a login request based on the eye recognition through the webpage. For example, referring to FIG. 5, instead of inputting an ID 501 and then inputting a password 502 to log in on a login screen 500 of the webpage, the user may request an eye recognition based login 503. Here, the server 150 may receive a login request signal based on the eye recognition through the webpage and may allow an ID included in the login request signal to enter a standby queue for login authentication. That is, the server 150 temporarily stores login information that requests the eye recognition. The server 150 requests the user to execute the application on the electronic device 110 and to perform eye recognition using the application and then enters standby.

In 3, if the user executes the application on the electronic device 110 for the eye recognition, the application executed on the electronic device 110 may inquire the server 150 about whether the ID desiring to log in is present in the standby queue of the server 150.

As shown in 4, the server 150 may verify whether the ID inquired by the application installed and executed on the electronic device 110 is stored in the standby queue and may transfer a verification result to the electronic device 110.

Figure 6:
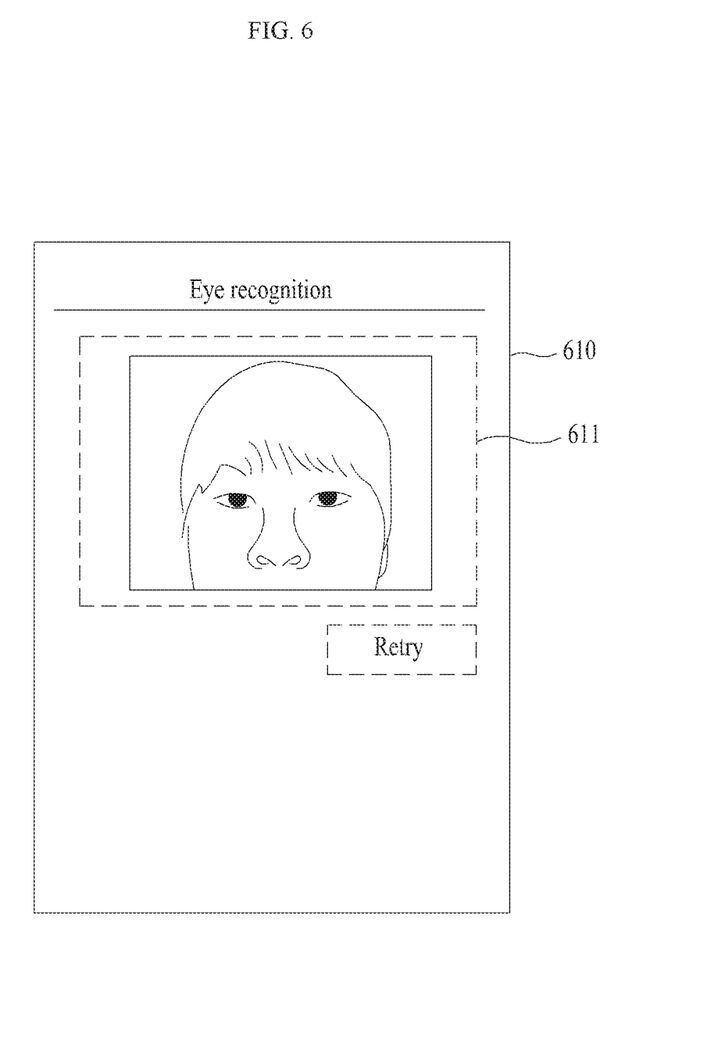
FIG. 6 illustrates an example of eye recognition process according to an exemplary embodiment.

In 5, in response to the ID being verified to be present in the standby queue of the server 150, an eye recognition screen 610 of FIG. 6 may be executed for eye recognition. Here, the eye recognition screen 610 may include a camera execution screen 611 capable of capturing eyes of the user. The application may extract eye information of the user from an image captured through a camera and may compare the extracted eye information to eye information registered in advance. If the two eye information match, the application may transmit an eye recognition success message to the server 150.

In 6, once the eye recognition success message is received from the application installed and executed on the electronic device 110, the server 150 may delete the ID that is stored in the standby queue in response to the user logging in to the webpage.

In 7, the server 150 may transfer a login success message associated with the webpage for which the login based on eye recognition is requested and thereby control the user to login and connect to the webpage in response to the successful login authentication.

Hereinafter, an exemplary embodiment of an authentication system with an enhanced security based on an eye recognition and an authentication method performed at the authentication system will be described.

As a service exclusive application associated with the server 150, an application that may perform eye recognition may be a program that is installed on the electronic device 110 and includes a code for independently controlling the electronic device 110. Also, the application may be a program that includes a code for controlling the electronic device 110 by additionally using an instruction from the server 150 through communication with the server 150. For example, the application may be a payment application. Here, the payment application may perform eye recognition according to exemplary embodiments.

Figure 7:
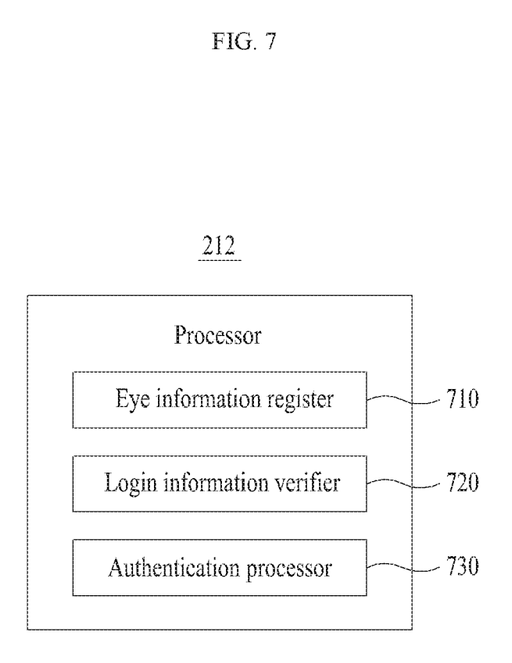
FIG. 7 illustrates an example of elements that may be comprised in a processor of an electronic device according to an exemplary embodiment.
Figure 8:
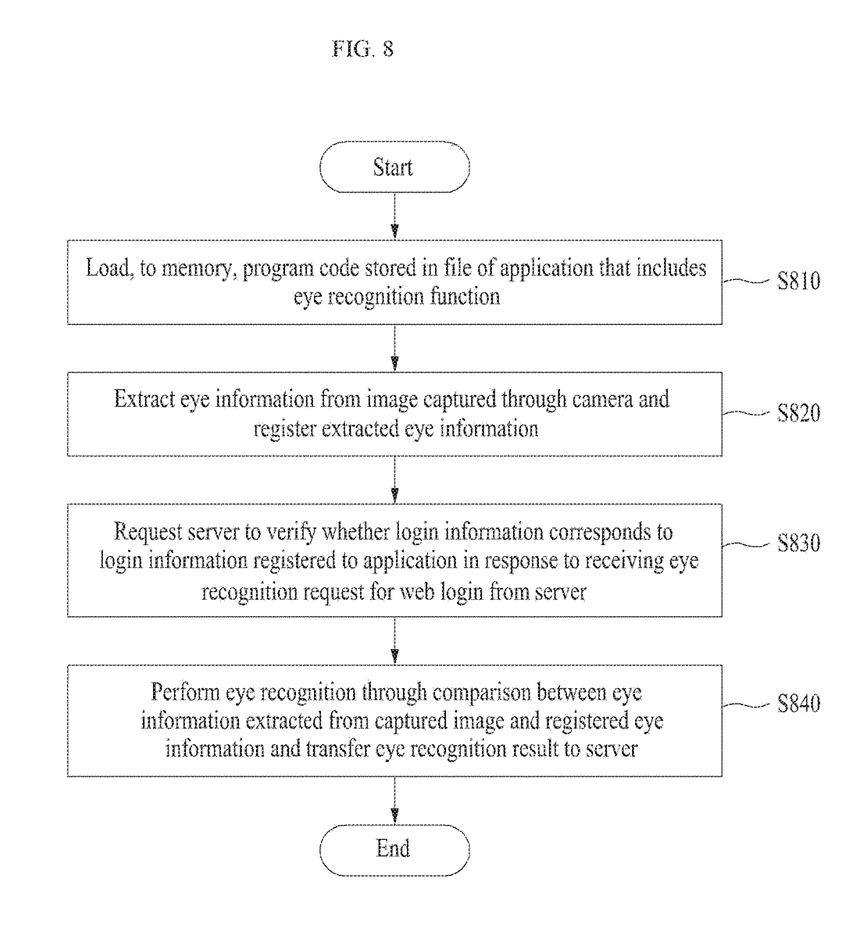
FIG. 8 is a flowchart illustrating an example of a method performed in an electronic device according to an exemplary embodiment.

FIG. 7 illustrates an example of elements includable in a processor of an electronic device according to an exemplary embodiment, and FIG. 8 is a flowchart illustrating an example of a method performed at an electronic device according to an exemplary embodiment.

Referring to FIG. 7, the processor 212 of the electronic device 110 may include an eye information register 710, a login information verifier 720, and an authentication processor 730. The processor 212 and the elements of the processor 212 may control the electronic device 110 to perform operations S810 through S840 illustrated in the method of FIG. 8. The processor 212 and the elements of the processor 212 may be configured to execute instructions according to a code of at least one program and a code of an OS included in the memory 211. Here, the at least one program may correspond to the application that may perform the aforementioned eye recognition. Also, the elements of the processor 212 may represent different operations performed at the processor 212 in response to a control instruction provided from the OS or the application. For example, the eye information register 710 may represent registering eye information in response to the control instruction by the processor 212.

In operation S810, the processor 212 may load, to the memory 211, a program code stored in a file of an application that may perform eye recognition. For example, the application that may perform eye recognition may include a control instruction for controlling the electronic device 110 to perform the authentication method. In response to an execution of the application installed on the electronic device 110, the processor 212 may control the electronic device 110 to load the program code from the file of the application to the memory 211.

Here, the processor 212 including the eye information register 710, the login information verifier 720, and the authentication processor 730 may perform operations S820 through S840 by executing an instruction of a portion corresponding to the program code loaded the memory 211. To perform operations S820 through S840, the processor 212 and the elements of the processor 212 may control the electronic device 110. For example, the file of the application may be stored in and managed in a storage (not shown) further includable in the electronic device 110. Here, the processor 212 may control the electronic device 110 to perform the entire process of copying the program code from the file of the application stored in the storage and loading the copied program code to the memory 211.

In operation S820, the eye information register 710 may extract eye information from an image captured through a camera and may register the extracted eye information in response to a request for registering the eye information from the user. Here, the eye information may be stored in the electronic device 110, and may be mapped to a user's login information, for example, an ID of the user registered to the application, and thereby the user's login information may be registered.

In operation S830, in response to receiving an eye recognition request for a web login from the server 150 associated with the application, the login information verifier 720 may verify whether the login information of the user requesting the eye recognition corresponds to the login information registered to the application. That is, in response to the user requesting the web login based on the eye recognition, the server 150 may temporarily store the login information of the user in a standby queue for a login authentication. Here, prior to performing the eye recognition in response to the web login request, the login information verifier 720 may request the server 150 to verify whether the login information of the user that is logged in the application is present in the standby queue of the server 150. In response thereto, the server 150 may verify whether the login information requested at the login information verifier 720 is present in the standby queue and may transfer a verification result to the login information verifier 720. However, exemplary embodiments of the inventive concept are not limited thereto. For example, in response to receiving a request to perform eye recognition from the user, whether login information registered to the application is present in the standby queue for the web login may be verified prior to executing the eye recognition function.

In operation S840, once the login information of the user that is logged in the application is verified to be stored in the standby queue of the server 150 and to be waiting, the authentication processor 730 may extract eye information from the image captured through the camera, may perform the eye recognition through comparison between the extracted eye information and the pre-registered eye information, and may transfer an eye recognition result to the server 150. That is, when the login information is verified and the eye information extracted from the captured image matches the pre-registered eye information, the authentication processor 730 may transmit an eye authentication success message to the server 150.

Accordingly, the application that may perform eye recognition in the electronic device 110 may initially verify whether login information of a user requesting eye recognition corresponds to login information registered to the application in response to an eye recognition request for a web login, and may perform an eye recognition process for a web login authentication when web login information is verified to correspond to the login information registered to the application. The application of the electronic device 110 may verify login information between the web and the application, may call a corresponding application program interface (API) to the server 150 for the eye recognition corresponding to the verified login information, and may perform eye recognition logic through an open-source level library in response to the login request.

Figure 9:
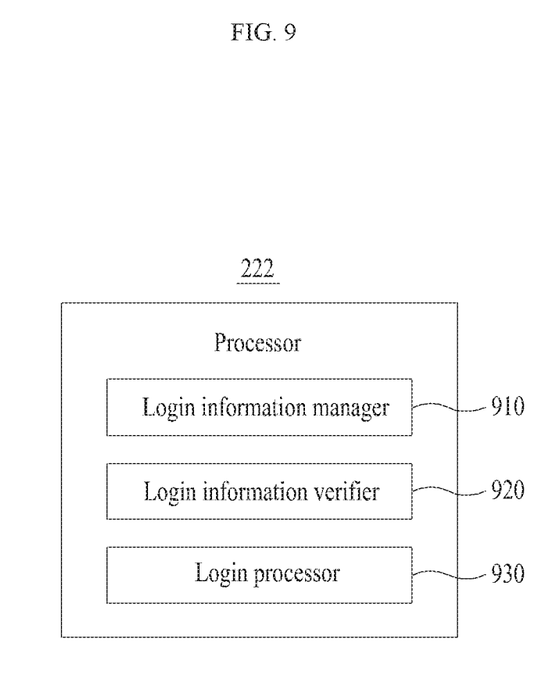
FIG. 9 illustrates an example of elements that may be comprised in a processor of a server according to an exemplary embodiment.
Figure 10:
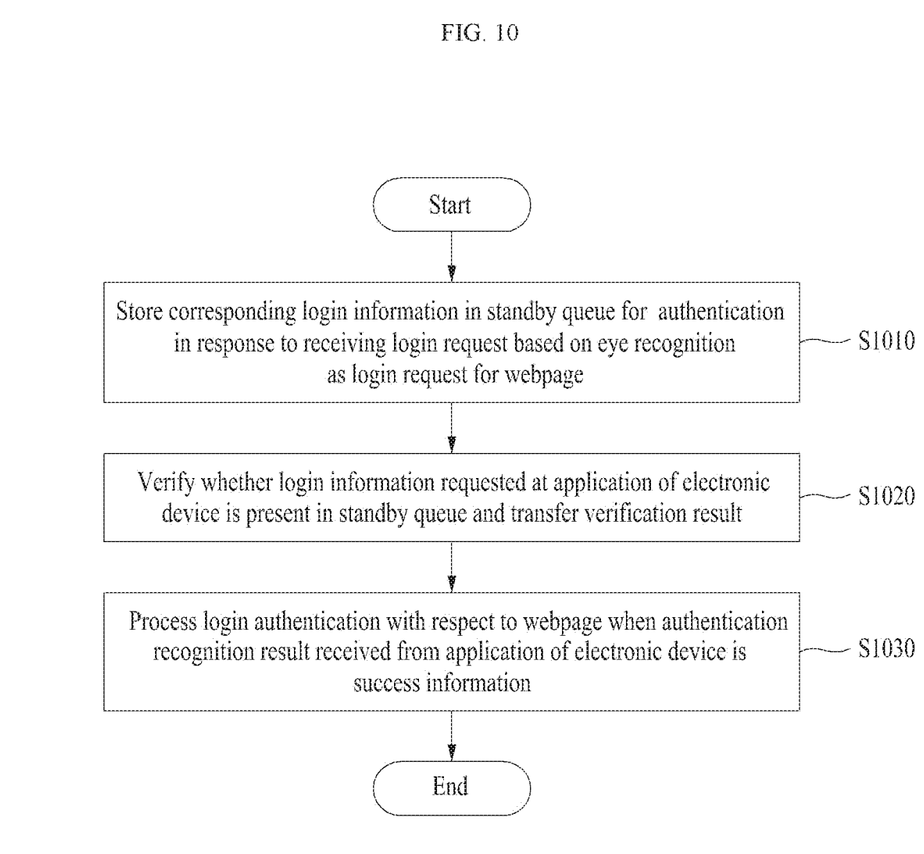
FIG. 10 is a flowchart illustrating a method performed at a server according to an exemplary embodiment.

FIG. 9 illustrates an example of elements includable in a processor of a server according to an exemplary embodiment, and FIG. 10 is a flowchart illustrating a method performed at a server according to an exemplary embodiment. Referring to FIG. 9, the processor 222 of the server 150 may include a login information manager 910, a login information verifier 920, and a login processor 930. The processor 222 and the elements of the processor 222 may control the server 150 to perform operations S1010 through S1030 illustrated in FIG. 10, and may be configured to execute a code of at least one program and an OS included in the memory 221 to perform such control.

In operation S1010, in response to receiving a login request based on eye recognition as a login request for a webpage associated with the server 150, the login information manager 910 may store corresponding login information in a standby queue for a login authentication. That is, in response to the user inputting login information, such as an ID, and inputting a password to log in the webpage, the login information manager 910 may temporarily store the login information input from the user in a standby queue. Here, the server 150 may transfer, to an application of the electronic device 110 corresponding to the login information, an eye recognition request for the web login together with the login information. With respect to an attempt to log in the webpage with login information of the user in a security-poor environment, for example, a public PC, or a request for a higher-security web-page, for example, a mobile payment based on an NFC, the server 150 may request an eye recognition-based login to enhance the security.

In operation S1020, the login information verifier 920 may verify whether the login information requested at the application installed on the electronic device 110 is present in the standby queue for the login authentication and may transfer the verification result to the application of the electronic device 110. That is, the application of the electronic device 110 may request the server 150 to verify whether login information of the user that is logged in the application corresponds to the login information that requests the web login. In response thereto, the login information verifier 920 may verify whether the login information requested is present in the standby queue and may provide a verification result.

In operation S1030, the login processor 930 may receive an eye recognition result from the application of the electronic device 110 with respect to the login information stored in the standby queue, and may process the login authentication with respect to the webpage when the received eye recognition result is successful. That is, if the eye recognition succeeds at the application with respect to the webpage associated with the requested eye recognition-based login, the login processor 930 may transfer a login success message and enable the user to login and connect to the webpage in response to the successful login authentication. Here, if the eye recognition result received from the application of the electronic device 110 is successful, the login information manager 910 may delete, from the standby queue, the corresponding login information temporarily stored in the standby queue for the login authentication.

Accordingly, the server 150 may perform the user authentication based on the eye recognition in conjunction with the application in response to the web login request or the mobile payment request, etc., and, if the user authentication succeeds, the server 150 may authenticate the web login.

According to exemplary embodiments, it is possible to configure user authentication technology with a further enhanced security by performing authentication on a user requesting a web login, based on eye recognition in an application such as a mobile application. According to exemplary embodiments, it is possible to provide a further more convenient and secure service environment by performing a user authentication based on an eye recognition instead of using, for example, a password for a login through a public PC or a mobile payment using an NFC, etc.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes of the present disclosure, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments.

While certain example embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. An authentication method at an electronic device of a user comprising a hardware processor configured to execute computer-readable instructions, the authentication method comprising:
registering an eye information extracted from an input image through a pre-registration process;
receiving an eye recognition request from the user;
verifying whether a web login request, associated with a login information that is mapped to the eye information, is present in a server, in response to receiving the eye recognition request; and
performing an eye recognition in response to the web login request associated with the login information being verified to be present in the server,
wherein the verifying of whether the web login request is present further comprises verifying whether the login information corresponds to a second login information associated with the web login request to the server.

2. The authentication method of claim 1, wherein registering the eye information further comprises mapping the eye information to the login information, and storing the mapped eye information on the electronic device.

3. The authentication method of claim 1, wherein the verifying whether the web login request is present further comprises verifying whether the second login information corresponding to the login information is present among a plurality of second login information that are stored in a standby queue for a login authentication on the server.

4. The authentication method of claim 1, wherein receiving the eye recognition request further comprises:
extracting a second eye information from an image acquired through a camera in response to the login information corresponding to the second login information; and
transmitting, to the server, an eye recognition result acquired by comparing the second eye information to the eye information,
wherein the server is configured to authenticate the web login request associated with the second login information based on the eye recognition result.

5. An authentication method at a server comprising a hardware processor configured to execute computer-readable instructions, the authentication method comprising:
receiving a login request based on an eye recognition and a login information for a webpage associated with the server;
storing the login information in a standby queue for a login authentication in response to the login request based on the eye recognition;
receiving, from an electronic device of a user corresponding to the login information stored in the standby queue, an eye recognition result performed at the electronic device requested by the user; and
authenticating a login to the webpage corresponding to the login information based on the eye recognition result.

6. The authentication method of claim 5, further comprising:
deleting the login information from the standby queue in response to the eye recognition result being received from the electronic device.

7. The authentication method of claim 5, further comprising:
transmitting, to the electronic device, a result of verifying whether the login information is present in the standby queue in response to a request from the electronic device,
wherein, in response to the login information being verified to be present in the standby queue, the electronic device is configured to perform the eye recognition.

8. An authentication system configured as a computer of a user, the authentication system comprising:
a hardware processor configured to execute computer-readable instructions to:
register an eye information extracted from an input image through a pre-registration process;
receive an eye recognition request from the user;
verify whether a web login request associated with a login information that is mapped to the eye information is present in a server, in response to receiving an eye recognition request; and
perform an eye recognition in response to the web login request associated with the login information being verified to be present,
wherein the hardware processor is further configured to verify whether the login information corresponds to a second login information that requests associated with the web login request to the server.

9. The authentication system of claim 8, wherein the hardware processor is further configured to map the eye information to the login information, and to store the mapped eye information.

10. The authentication system of claim 8, wherein the hardware processor is further configured to verify whether the second login information corresponding to the login information is present among a plurality of second login information that are stored in a standby queue for a login authentication on the server.

11. The authentication system of claim 1, wherein the hardware processor is further configured to
extract a second eye information from an image acquired through a camera in response to the login information corresponding to the second login information;
transmit, to the server, an eye recognition result acquired by comparing the second eye information to the eye information,
wherein the server is configured to authenticate the web login request associated with the second login information based on the eye recognition result.

12. An authentication system configured as a computer, the authentication system comprising:
- a hardware processor configured to execute computer-readable instructions to:
- receive a login request based on an eye recognition and a login information associated with a webpage associated with the computer;
- store the login information in a standby queue for a login authentication in response to the login request based on the eye recognition;
- receive, from an electronic device of a user corresponding to the login information stored in the standby queue, an eye recognition result performed at the electronic device requested by the user; and
- authenticate a login to the webpage corresponding to the login information based on the eye recognition result.

13. The authentication system of claim 12, wherein the hardware processor is further configured to delete the login information from the standby queue in response to the eye recognition result being received from the electronic device.

14. The authentication system of claim 12, wherein the hardware processor is further configured to
- transmit, to the electronic device, a result of verifying whether the login information is present in the standby queue in response to a request from the electronic device,
- wherein, in response to the login information being verified to be present in the standby queue, the electronic device is configured to perform the eye recognition.

* * * * *